US012710152B2

(12) United States Patent
Bungenstock et al.

(10) Patent No.: US 12,710,152 B2
(45) Date of Patent: Aug. 18, 2026

(54) HEADLIGHT FOR A MOTOR VEHICLE

(71) Applicant: HELLA GMBH & CO. KGAA, Lippstadt (DE)

(72) Inventors: Carmen Bungenstock, Kleinenberg (DE); Gerhard Kloos, Erwitte (DE); Philip Stroop, Schloß Holte-Stukenbrock (DE); Benjamin Willeke, Paderborn (DE)

(73) Assignee: HELLA GMBH & CO. KGAA, Lippstadt (DE)

(*) Notice: Subject to any disclaimer, the term of this patent is extended or adjusted under 35 U.S.C. 154(b) by 0 days.

(21) Appl. No.: 19/110,957

(22) PCT Filed: Sep. 11, 2023

(86) PCT No.: PCT/EP2023/074886

§ 371 (c)(1),
(2) Date: Mar. 12, 2025

(87) PCT Pub. No.: WO2024/061675

PCT Pub. Date: Mar. 28, 2024

(65) Prior Publication Data

US 2026/0085802 A1 Mar. 26, 2026

(30) Foreign Application Priority Data

Sep. 20, 2022 (DE) ......................... 102022124020.7

(51) Int. Cl.
*F21S 41/275* (2018.01)
*F21S 41/26* (2018.01)
(Continued)

(52) U.S. Cl.
CPC ............. *F21S 41/275* (2018.01); *F21S 41/26* (2018.01); *F21S 41/30* (2018.01); *F21W 2102/18* (2018.01)

(58) Field of Classification Search
CPC ........... F21S 41/275; F21S 41/26; F21S 41/30
See application file for complete search history.

(56) References Cited

U.S. PATENT DOCUMENTS

2019/0079217 A1* 3/2019 De Lamberterie ... F21S 41/275
2024/0003510 A1* 1/2024 Sugihara .............. F21S 41/143
(Continued)

FOREIGN PATENT DOCUMENTS

DE 19814480 A1 10/1999
DE 102007049835 A1 4/2009
(Continued)

*Primary Examiner* — Christopher E Dunay
(74) *Attorney, Agent, or Firm* — WARNER NORCROSS + JUDD LLP

(57) ABSTRACT

The invention relates to a headlight for a motor vehicle. The headlight includes at least one light source and an optical system with a plurality of optical components to shape the light emitted by the at least one light source and to project it into the space outside the motor vehicle in such a way that a dipped beam distribution of the headlight, which has a light-dark boundary, is produced, and light portions located above this light-dark boundary in order to implement an OS function. The headlight further includes at least one refractive structure on at least one of the optical components and has a plurality of structural elements, the structure being set up to deflect light passing through the optical component into a region above the light-dark boundary in order to implement the OS function, at least one of the structural elements being of annular or partially annular design.

8 Claims, 4 Drawing Sheets

(51) Int. Cl.
*F21S 41/30* (2018.01)
*F21W 102/18* (2018.01)

(56) References Cited

U.S. PATENT DOCUMENTS

| | | | | |
|---|---|---|---|---|
| 2024/0117949 | A1* | 4/2024 | Bungenstock | F21V 5/045 |
| 2025/0067410 | A1* | 2/2025 | Fischer | F21S 41/255 |
| 2025/0075869 | A1* | 3/2025 | Kloos | F21S 41/275 |
| 2025/0084975 | A1* | 3/2025 | Kloos | F21S 41/143 |

FOREIGN PATENT DOCUMENTS

| | | | |
|---|---|---|---|
| DE | 102015007832 | A1 | 12/2016 |
| DE | 102009020593 | A1 | 8/2017 |
| DE | 102016109132 | A1 | 11/2017 |
| WO | 2007022861 | A1 | 3/2007 |

* cited by examiner

HEADLIGHT FOR A MOTOR VEHICLE

CROSS-REFERENCE TO RELATED APPLICATIONS

This application is the National Stage of International Application No. PCT/EP2023/074886 filed on Sep. 11, 2023, which claims priority to and all advantages of German Patent Application No. 10 2022 124 020.7 filed on Sep. 20, 2022, the disclosures of which are hereby incorporated by reference in their entirety.

BACKGROUND

The present invention relates to a headlight for a motor vehicle and a method of manufacturing an optical component of the headlight.

Among other things, such a headlight must meet the technical lighting requirements of the respective approval area, such as ECE or CCC or SAE. The photometry to be fulfilled also has so-called OS values (overhead sign values). These are measuring points that lie above the light-dark boundary of the light distribution. The purpose of this requirement is to ensure that, for example, highway signs mounted above the roadway can be safely recognized and read by the driver.

The light intensities that must be achieved at the corresponding measuring points are comparatively low. These measuring points are located at large, positive vertical angles. The requirement to tend these measuring points is somewhat at odds with the main requirement for a dipped beam, namely the condition that no or hardly any light should be emitted into the traffic area above the light-dark boundary. In principle, the entire headlight is designed for this purpose.

A headlight of the type mentioned above is known from DE 10 2009 020 593 A1. In the headlight described therein, a secondary optical system designed as a plano-convex projection lens is provided, which has more than one hundred discretely distributed projections on its convex surface, which serve to implement an OS function. Geometries added to the projection lens usually have the major disadvantage that, in addition to the increased manufacturing effort and the possibly increased susceptibility to faults, they are visible when looking at the headlight and therefore have a negative effect on the external appearance of the headlight.

Another headlight is known from DE 10 2016 109 132 A1. The headlight described therein comprises a plurality of first light sources in the form of light-emitting diodes for a high beam and a dipped beam. The spotlight also comprises a primary optical system consisting of two light guides into which the light emitted by the light-emitting diodes is coupled. The headlight also comprises a secondary optical system in the form of a projection lens, which can project the light emitted by the primary optical system into the space outside of the vehicle. The light distribution produced by the headlight has a horizontal light-dark boundary and light portions located above this light-dark boundary in order to implement an OS function (overhead sign function). To produce this OS function, a prismatic step is formed on a first of the light guides of the primary optical system, through which light emitted by the second of the light guides can enter the first light guide. This portion of the light entering the first light guide from the second light guide is deflected upwards by the secondary optical system such that it reaches a region above the light-dark boundary of the dipped beam.

The disadvantage of this is that additional geometries on the primary optical system or on the projection lens mean increased manufacturing effort and can lead to increased susceptibility to faults. The increased susceptibility to faults can be caused, for example, by shape deviations in terms of functionality or by air inclusions or streaks or flow lines or similar in terms of optical quality.

SUMMARY

The problem underlying the present invention is the creation of a headlight of the type mentioned at the beginning, which can be manufactured more easily and at lower cost. Furthermore, a method for manufacturing an optical component of the headlight is to be specified.

According to the invention, this is achieved by a headlight of the type mentioned at the beginning with the features set forth herein and by a method of the type mentioned at the beginning with the features set forth herein.

According to one embodiment, it is provided that at least one of the structural elements is annular or partially annular. Several, preferably all, of the structural elements of the refractive structure can be annular or partially annular. Like a Fresnel lens, the structural elements can therefore deflect parts of the light passing through them in the desired direction.

It is possible for the annular or partially annular structural elements to be arranged coaxially or concentrically to one another. A first of the annular or partially annular structural elements can have a smaller diameter than a second of the annular or partially annular structural elements.

It may be provided that at least one of the structural elements is designed partially annular in a manner such that it extends over less than 360°in the circumferential direction, in particular extends only over one sector of a circle. As a result, only a smaller part of the optical component on which the refractive structure is arranged is modified, such that the optical component can fulfill its actual function more effectively.

It is possible for the structural elements of the at least one structure to have a width of between 0.5 mm and 1.0 mm. This size means that the refractive structure is easier to manufacture than microscopic structures, for example.

It may be provided that at least one of the optical components is designed as a lens, in particular as an aspherical lens, with the refractive structure being integrated into the lens.

Alternatively, it may be provided that at least one of the optical components is designed as a lens having a Fresnel structure, with the refractive structure being integrated into the Fresnel structure. The Fresnel structure may comprise annular steps, each having a useful flank and an interference flank, the useful flank being that region of the step which is adapted for light to pass through it, and the interference flank being that region of the step which is not adapted for light to pass through it, with both the useful flanks and the interference flanks of the Fresnel structure including an angle of incidence with the optical axis of the lens. The geometry of a refractive structure integrated into a Fresnel structure can be specified using a deterministic method with a suitable algorithm. This means that no optimization loops are necessary and iterations are eliminated.

It is possible that the integration of the refractive structure into the Fresnel structure leads to a partial change in the angle of incidence of the interference flanks of the Fresnel structure, in particular wherein the useful flanks of the Fresnel structure are not changed by the integration of the refractive structure into the Fresnel structure. By retaining the geometry of the useful flanks, the actual function of the Fresnel structure is not impaired. As a rule, scattered light is produced at the interference flanks of a Fresnel structure, which is deflected into a solid angle range above the light-dark boundary. This scattered light can lead to an increase in glare, in particular in the forward direction or in the range of a so-called HV value. By changing the angle of incidence of the Fresnel structure's interference flanks, the solid angle range into which the scattered light is deflected is shifted upwards. As a result, unwanted glare in the forward direction is reduced on the one hand and the overhead signal values are increased on the other.

It may be provided that the headlight comprises a primary optical system and a secondary optical system, in particular wherein the primary optical system is set up to shape the light emitted by the at least one light source in such a manner that an extended light distribution is produced, and wherein the secondary optical system is set up to convert the extended light distribution produced by the primary optical system into a light distribution corresponding to the dipped beam distribution of the headlight. The secondary optical system can have a projection lens.

It is possible that the refractive structure is arranged on the projection lens of the secondary optical system. The refractive structure can be integrated into the coupling side or the decoupling side of the projection lens of the secondary optical system.

According to another embodiment, it is provided that the optical component is manufactured from plastic by injection molding, wherein the refractive structure is also produced during the injection molding. This eliminates the need for additional work steps to insert the refractive structure into the optical component.

BRIEF DESCRIPTION OF THE DRAWINGS

The invention is explained in more detail below with reference to the accompanying drawings. In the figures.

In the figures, identical and functionally identical parts are provided with the same reference signs.

DETAILED DESCRIPTION

Figure 1:
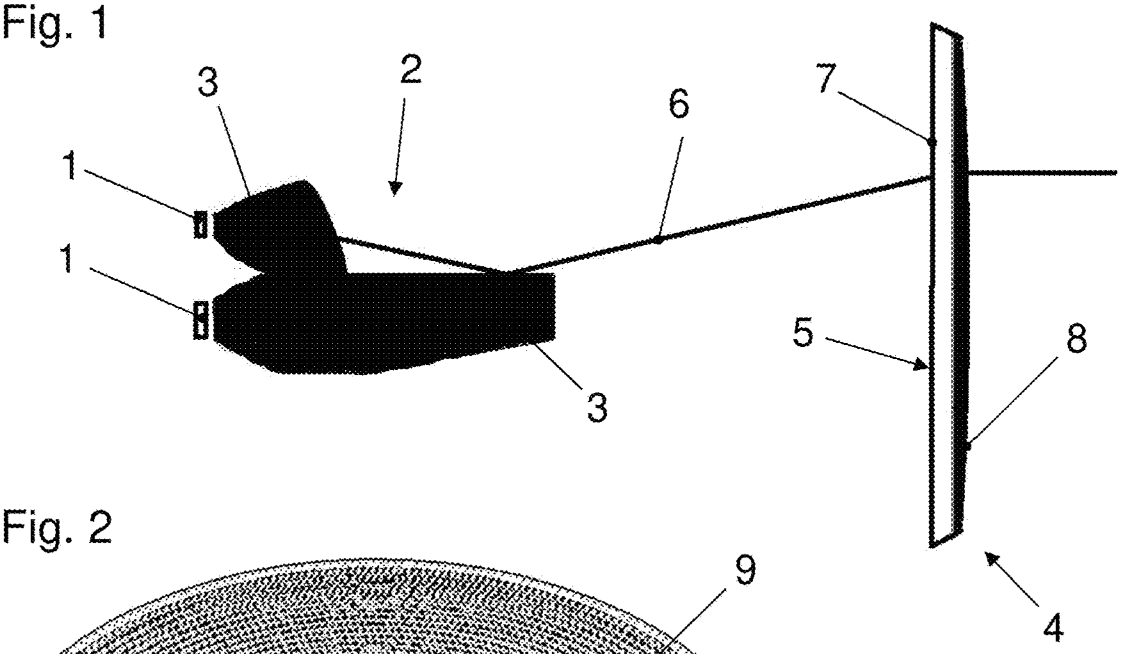
FIG. 1 is a schematic side view of a headlight according to the invention with light rays drawn as examples.

The exemplary embodiment of a headlight according to the invention shown in FIG. 1 comprises two light sources 1, shown only schematically, a primary optical system 2, which has two interconnected optical components 3, and a secondary optical system 4, which in particular has only one optical component designed as a projection lens 5. It is entirely possible for the primary optical 2 to consist of only one component 3 or more than two components 3. It is also possible for the secondary optical system 4 to consist of more than one component.

The primary optical system 2 is set up to shape the light 6 emitted by the light sources 1 in such a manner that an extended light distribution is produced. Furthermore, the secondary optical system 4 is set up to convert the extended light distribution produced by the primary optical system 2 into a light distribution corresponding to the dipped beam distribution of the headlight, which has a light-dark boundary and light portions arranged above this light-dark boundary in order to implement an OS function.

Figure 2:
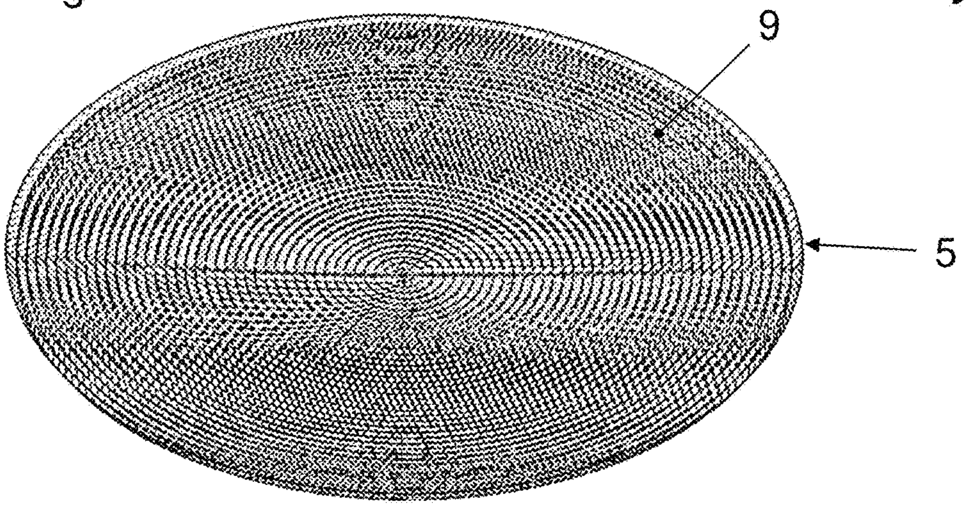
FIG. 2 is a perspective view of a first embodiment of a projection lens of the headlight according to FIG. 1, wherein the projection lens is provided with a Fresnel structure.

The projection lens 5 has a coupling side 7 for the light 6 emitted by the primary optical system 2 and a decoupling side 8 from which the light 6 can emerge. The projection lens 5 is designed as a lens having a Fresnel structure 9, wherein the Fresnel structure 9 is arranged on the decoupling side 8 of the projection lens 5 (see FIG. 1 and FIG. 2). In the exemplary embodiment the coupling side 7 is flat.

Figure 3A:
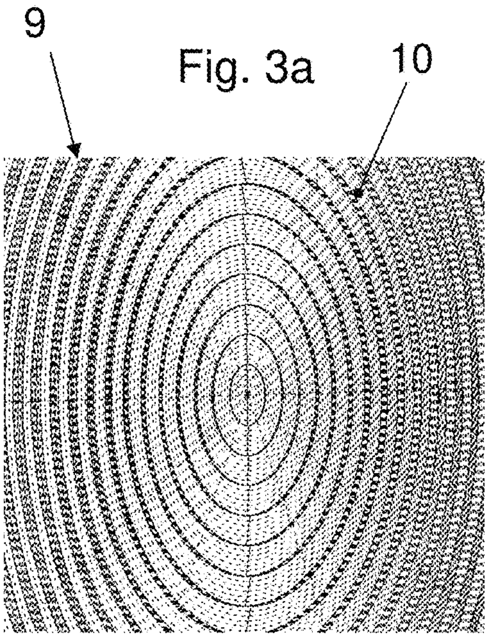
FIG. 3*a*is a section of a Fresnel structure in which no refractive structure is integrated in order to implement the OS function.
Figure 3B:
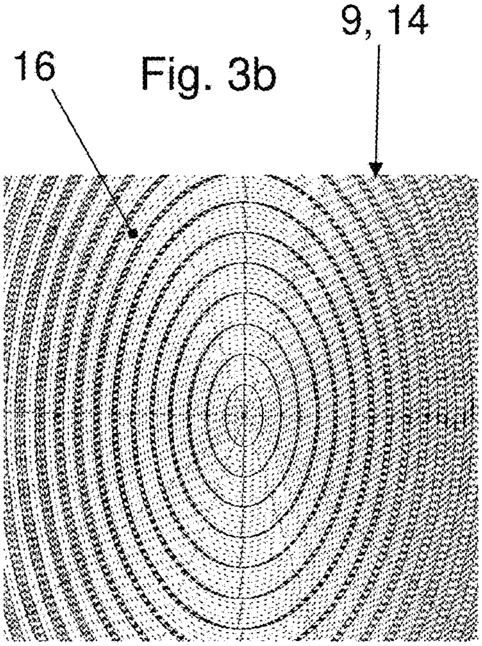
FIG. 3*b*is a section of a Fresnel structure in which a refractive structure is integrated in order to implement the OS function.
Figure 4A:
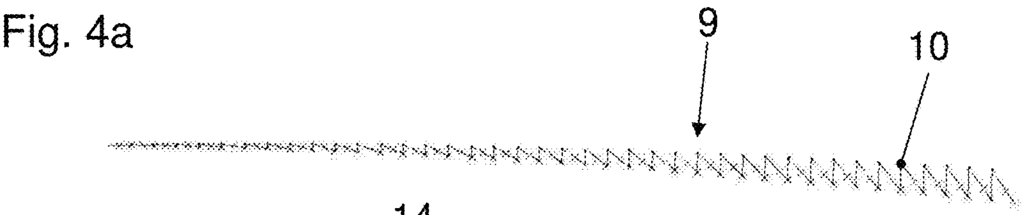
FIG. 4*a*is a schematic section through a part of the Fresnel structure according to FIG. 3*a*.
Figure 5A:
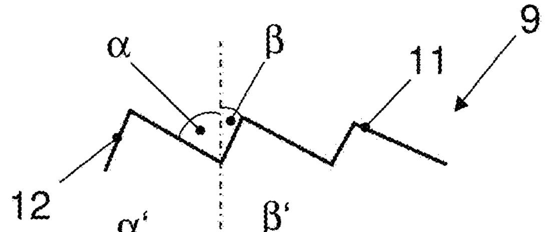
FIG. 5*a*is an exaggerated schematic detail of the section shown in FIG. 4*a*.

The Fresnel structure 9 comprises annular steps 10, each of which has a useful flank 11 and an interference flank 12 (see FIG. 3, FIG. 4*a* and FIG. 5*a*). The useful flank 11 is the region of the step 10 that is designed to allow light to pass through it, and the interference flank 12 is the region of the step 10 that is not designed to allow light to pass through it. Both the useful flanks 11 and the interference flanks 12 of the Fresnel structure 9 include an angle of incidence with the optical axis 13 of the lens $\alpha$, $\beta$ (see FIG. 5*a*).

In the illustrated exemplary embodiment, the height of the annular steps 10 increases from the center of the projection lens 5 in a radial direction towards the outside. This can be seen in FIG. 4*a*, which shows a radial section through the Fresnel structure 9, with the left end of FIG. 4*a* corresponding to the center of the projection lens 5 and the right end of FIG. 4*a* corresponding to the edge of the projection lens 5. It is entirely possible that the height of the steps 10 does not change in a radial direction or changes in some other manner.

Figure 6:
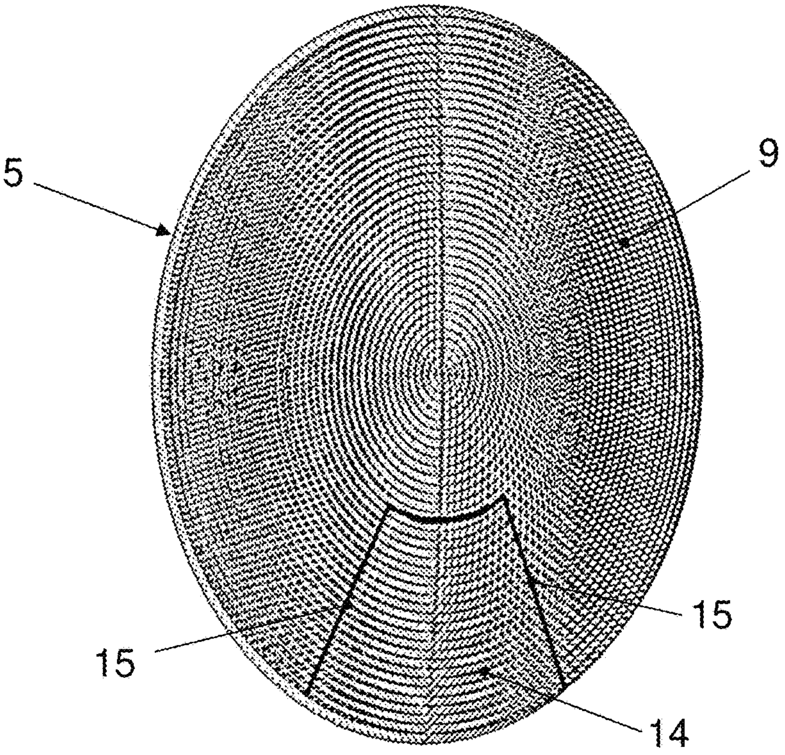
FIG. 6 is a perspective view of a second embodiment of a projection lens of a headlight according to the invention, wherein the projection lens is provided with a Fresnel structure into which a refractive structure for implementing the OS function is integrated in sections.

In order to implement the OS function, a refractive structure 14 is also provided, which is integrated into the Fresnel structure 9 at least in sections. In the exemplary embodiment according to FIG. 3*b*, the refractive structure 14 is integrated into the Fresnel structure 9 on the entire decoupling side 8 of the projection lens 5. In the exemplary embodiment according to FIG. 6, the refractive structure 14 is only integrated into the Fresnel structure 9 in one segment 15 of the decoupling side 8.

Corresponding to the steps 10 of the Fresnel structure 9, the refractive structure 14 has structural elements 16 that are annular or partially annular (see FIG. 3*b*). The structural elements 16 of the refractive structure 14 can have a width b of between 0.5 mm and 1.0 mm in the radial direction (see FIG. 4*b*).

In the illustrated exemplary embodiment, the height of the structural elements 16 also increases from the center of the projection lens 5 in a radial direction towards the outside. This can be seen in FIG. 4*b*, which shows a radial section through the refractive structure 14, with the left end of FIG. 4*b* corresponding to the center of the projection lens 5 and the right end of FIG. 4*b* corresponding to the edge of the projection lens 5. It is entirely possible that the height of the structural elements 16 does not change in the radial direction or changes in some other way.

Figure 4B:
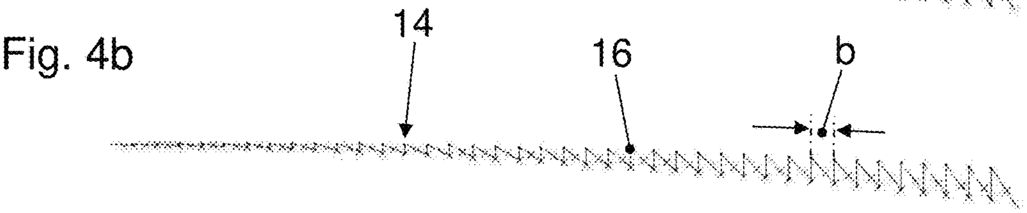
FIG. 4*b*is a schematic section through a part of the Fresnel structure according to FIG. 3*b*.
Figure 5B:
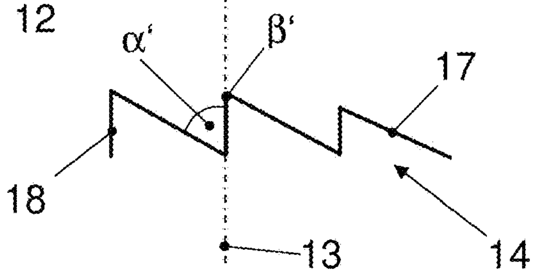
FIG. 5*b*is an exaggerated schematic detail of the section shown in FIG. 4*b*.

As with the Fresnel structure 9, the structural elements 16 of the refractive structure 14 each have a useful flank 17 and an interference flank 18 (see FIG. 4*b* and FIG. 5*b*). In the illustrated exemplary embodiment, the useful flank 17 of the refractive structure 14 corresponds to the useful flank 11 of the Fresnel structure 9. In particular, the angle of incidence α' of the useful flank 17 of the refractive structure 14 is equal to the angle of incidence α of the useful flank 11 of the Fresnel structure 9. By retaining the geometry of the useful flanks 17, the actual function of the Fresnel structure 9, in particular its function as a projection lens, is not impaired.

However, the angle of incidence β' of the interference flank 18 of the refractive structure 14 is not equal to the angle of incidence β of the interference flank 12 of the Fresnel structure 9. For example, the angle of incidence β of the interference flank 12 of the Fresnel structure 9 is approximately equal to 2°, whereas the angle of incidence β' of the interference flank 18 of the refractive structure 14 is approximately equal to 0°. Due to the changed angle of incidence β' of the interference flanks 18 of the refractive structure 14, the solid angle range into which scattered light is deflected is shifted upwards. As a result, the refractive structure 14 can be used to deflect light 6 passing through the projection lens 5 into a region above the light-dark boundary in order to implement the OS function. This has the effect of reducing unwanted glare in the forward direction on the one hand and increasing the overhead sign values on the other. This is illustrated as an example in FIG. 9 to FIG. 10.

Figure 9:
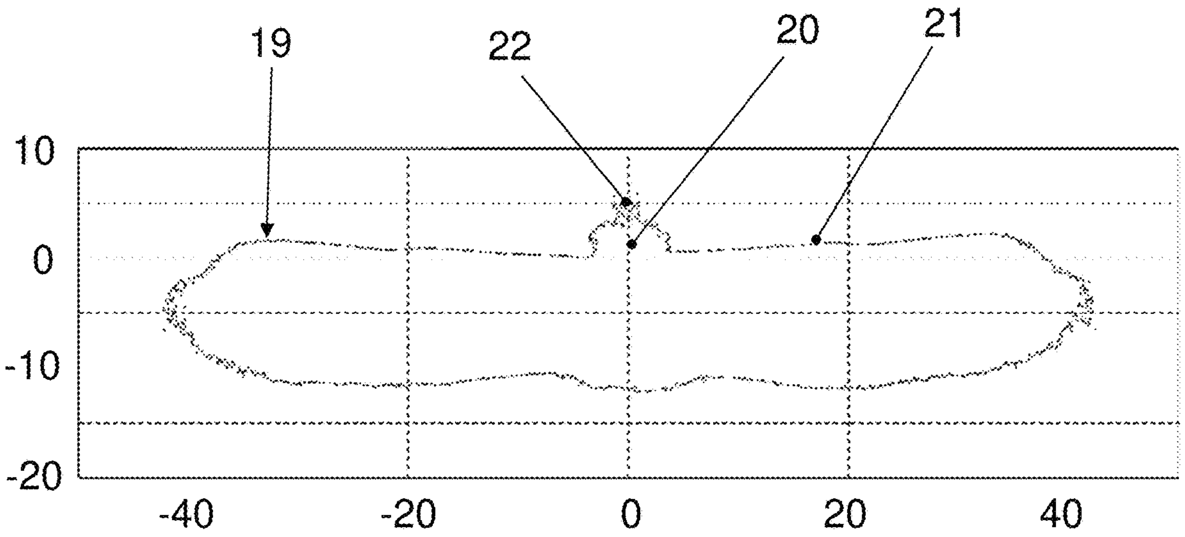
FIG. 9 is a light distribution produced by a headlight that does not have a refractive structure in order to implement the OS function.

FIG. 9 shows a dipped beam distribution 19 produced by a projection lens 5 having a Fresnel structure 9 without an integrated refractive structure 14. This dipped beam distribution 19 has a relatively high luminous intensity in a region 20 directly above the light-dark boundary 21, whereas in a region 22 further above, in which the overhead signal values must be met, only a very low luminous intensity is achieved. This means that there is undesirable glare in the forward direction in region 20, whereas only very low overhead signal values are achieved in region 22, which is located further above.

Figure 10:
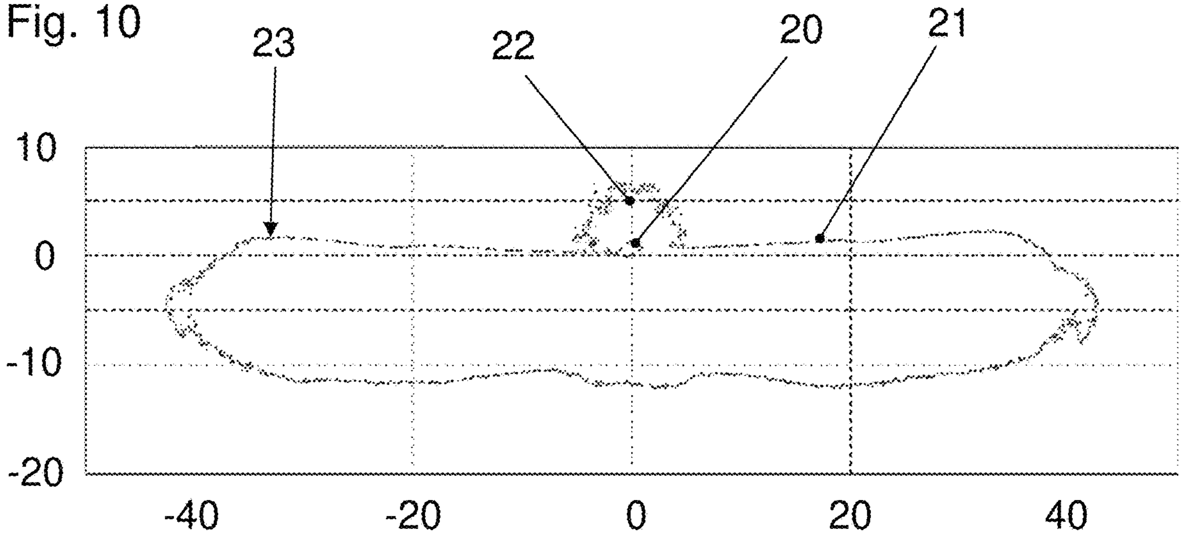
FIG. 10 is a light distribution produced by the headlight according to FIG. 1.

FIG. 10 shows a dipped beam distribution 23 produced by a projection lens 5 having a refractive structure 14 integrated into the Fresnel structure 9. This dipped beam distribution 23 has a reduced luminous intensity in the region 20 directly above the light-dark boundary 21, whereas a significantly greater luminous intensity is achieved in the region 22 further above. This means that there is less unwanted glare in the forward direction in region 20, whereas the overhead signal values are significantly higher in region 22, which is located further up.

It is entirely possible that the refractive structure 14 is not arranged on the decoupling side 8 of the projection lens 5, but on the coupling side 7 of the projection lens 5.

Figure 7:
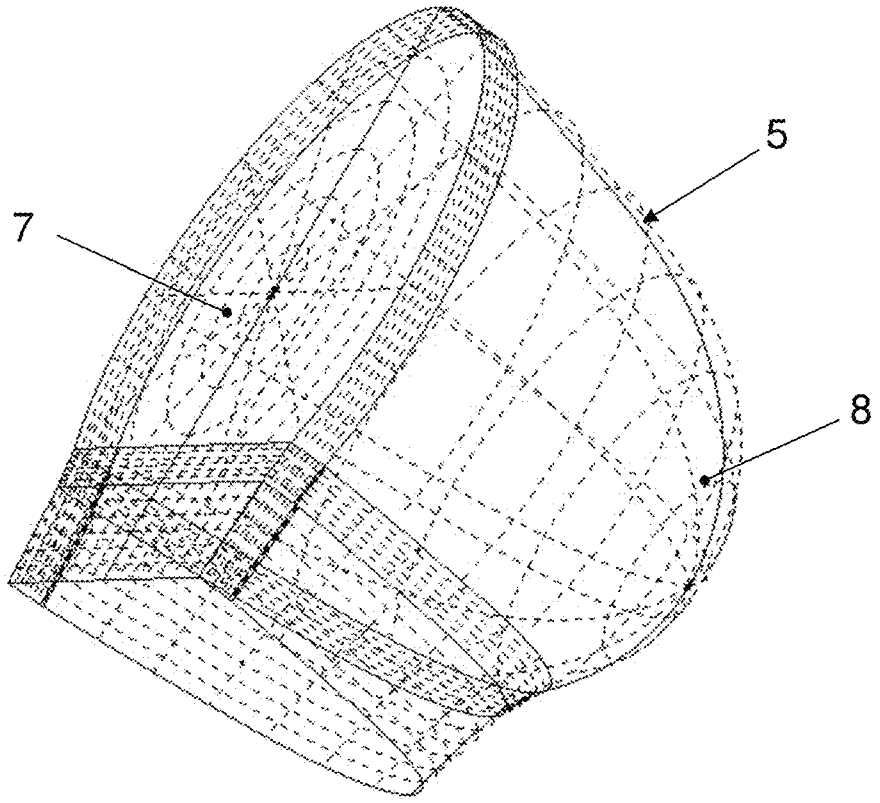
FIG. 7 is a perspective view of a projection lens of a headlight according to the state of the art.

FIG. 7 shows a projection lens 5 that does not have a Fresnel structure, but is designed as a lens, in particular as a plano-convex aspherical lens.

Figure 8:
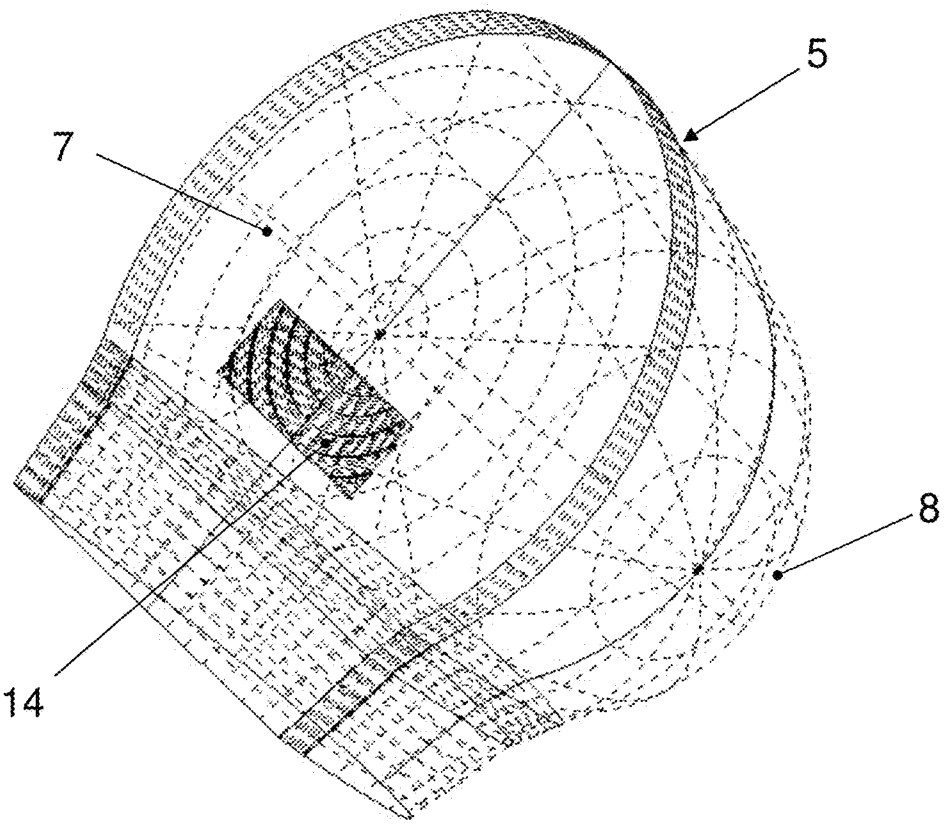
FIG. 8 is a perspective view of a third embodiment of a projection lens of a headlight according to the invention.

FIG. 8 shows a projection lens 5 that is similar in shape to the lens according to FIG. 7. However, a refractive structure 14 is integrated into the projection lens 5 and is set up to deflect light passing through the projection lens 5 into a region above the light-dark boundary in order to implement the OS function. The refractive structure 14 may be similar or identical to the structure 14 of the exemplary embodiments according to FIG. 2 to FIG. 6. In particular, the structure 14 has structural elements, at least one of which is annular or partially annular.

In the exemplary embodiment according to FIG. 8, the refractive structure 14 is arranged on the, in particular flat, coupling side 7 of the projection lens 5. It is entirely possible that the refractive structure 14 is arranged on the, in particular convex, decoupling side 8 of the projection lens 5.

List of Reference Signs

1 light source
2 primary optical system
3 optical component of the primary optical system
4 secondary optical system
5 projection lens of the secondary optical system
6 light emitted by the light source
7 coupling side of the projection lens
8 decoupling side of the projection lens
9 Fresnel structure of the projection lens
10 annular step of the Fresnel structure
11 useful flank of the Fresnel structure
12 interference flank of the Fresnel structure
13 optical axis of the lens formed by the Fresnel structure
14 refractive structure to realize the OS function
15 segment of the decoupling side of the projection lens
16 structural element of the refractive structure
17 useful flank of the refractive structure
18 interference flank of the refractive structure
19 dipped beam distribution produced by a projection lens having Fresnel structure without integrated refractive structure
20 region directly above the light-dark boundary of the dipped beam distribution
21 light-dark boundary of the dipped beam distribution
22 region of the dipped beam distribution in which the overhead sign values must be fulfilled
23 dipped beam distribution produced by a projection lens having a refractive structure integrated into the Fresnel structure
a width of the structural elements of the refractive structure in radial direction
α angle of incidence of the useful flank of the Fresnel structure
α' angle of incidence of the useful flank of the refractive structure
β angle of incidence of the interference flank of the Fresnel structure
β' angle of incidence of the interference flank of the refractive structure The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A headlight for a motor vehicle, comprising:

at least one light source;

an optical system with a plurality of optical components including a primary optical system and a projection lens, the projection lens defining an optical axis, the plurality of optical components being configured to shape the light emitted by the at least one light source and to project it into the space outside of the motor vehicle in such a way that a dipped beam distribution of the headlight is produced, which has a light-dark boundary and light components arranged above this light-dark boundary in order to implement an overhead sign (OS) function; and a refractive structure and a Fresnel structure, which are arranged on a common surface of the projection lens, the refractive structure and the Fresnel structure each including a plurality of structural elements, the plurality of structural elements comprising a plurality of annular steps, wherein each of the plurality of annular steps includes a useful flank and an interference flank, wherein the useful flank of the refractive structure is a continuous extension of the useful flank of the Fresnel structure and are angled identically to each other, wherein the interference flank of the refractive structure defines a first angle of incidence with respect to the optical axis of the projection lens, and wherein the interference flank of the Fresnel structure defines a second angle of incidence with respect to the optical axis of the projection lens, the first angle of incidence being zero, the second angle of incidence being greater than the first angle of incidence, wherein the refractive structure is disposed along a sub-portion of the common surface of the projection lens, such that the refractive structure is configured to deflect light passing through the projection lens into a region above the light-dark boundary in order to implement the OS function, wherein at least one of the structural elements of the refractive structure is annular or partially annular.

2. The headlight according to claim 1, wherein a first of the annular or partially annular structural elements has a smaller diameter than a second of the annular or partially annular structural elements.

3. The headlight according to claim 1, wherein at least one of the structural elements is designed partially annular in a manner such that it extends over less than 360° in the circumferential direction over a sector of a circle.

4. The headlight according to claim 1, wherein the structural elements of the at least one refractive structure have a width of between 0.5 mm and 1.0 mm.

5. The headlight according to claim 1, wherein at least one of the optical components includes an aspherical lens, the refractive structure being integrated into the aspherical lens.

6. The headlight according to claim 1, wherein the primary optical system is configured to shape the light emitted by the at least one light source in such a way that an extended light distribution is produced, and wherein the projection lens is configured to convert the extended light distribution produced by the primary optical system into a light distribution corresponding to the dipped light distribution of the headlight.

7. The headlight according to claim 1, wherein the refractive structure is integrated into the coupling side or the decoupling side of the projection lens.

8. A method of manufacturing an optical component of the headlight according to claim 1, wherein the refractive structure is arranged on the optical component and is configured to deflect light passing through the optical component into a region above the light-dark boundary in order to implement the OS function, wherein the optical component is manufactured from plastic by injection molding, wherein the refractive structure is also produced during the injection molding.

* * * * *